(12) United States Patent
Krishnamurthy et al.

(10) Patent No.: US 6,256,423 B1
(45) Date of Patent: Jul. 3, 2001

(54) INTRA-FRAME QUANTIZER SELECTION FOR VIDEO COMPRESSION

(75) Inventors: Ravi Krishnamurthy, Plainsboro; Sriram Sethuraman, Hightstown, both of NJ (US)

(73) Assignees: Sarnoff Corporation, Princeton, NJ (US); LG Electronics, Inc., Seoul (KR)

( * ) Notice: Subject to any disclaimer, the term of this patent is extended or adjusted under 35 U.S.C. 154(b) by 0 days.

(21) Appl. No.: 09/212,025

(22) Filed: Dec. 15, 1998

Related U.S. Application Data

(60) Provisional application No. 60/100,939, filed on Sep. 18, 1998.

(51) Int. Cl.$^7$ .............................. G06K 9/36; G06K 9/46
(52) U.S. Cl. ......................................... 382/251; 382/239
(58) Field of Search ................................ 348/401, 402, 348/403, 404; 382/248, 249, 250, 251, 252

(56) References Cited

U.S. PATENT DOCUMENTS

| | | | |
|---|---|---|---|
| 5,038,389 | * 8/1991 | Mizuno | 382/56 |
| 5,650,860 | * 7/1997 | Uz | 358/430 |
| 5,764,803 | 6/1998 | Jacquin et al. | |
| 5,969,764 | * 10/1999 | Sun et al. | 348/404 |

FOREIGN PATENT DOCUMENTS

| | | |
|---|---|---|
| 0 676 899 | 10/1995 | (EP) . |
| 0 703 711 | 3/1996 | (EP) . |
| 0 785 689 | 7/1997 | (EP) . |

OTHER PUBLICATIONS

Gonzalez et al., "Digital Image Processing", Addison–Wesley publishing Company, Inc. ISBN 0–201–50803–6, 1992.*

Coene W et al: "A Fast Route for Application of Rate–Distortion Optimal Quantization in an MPEG Video Encoder" Sep. 16, 1996, Proceedings of the International Conference on Image Processing (ICIP), US, New York, IEEE, pp. 825–828 XP000733350ISBN: 0–7803–3259–8 the whole document.

PCT International Search Report corresponding to PCT Application PCT/US99/21834.

* cited by examiner

*Primary Examiner*—Phucc Tran
*Assistant Examiner*—Amir Alavi
(74) *Attorney, Agent, or Firm*—William J. Burke; John V. Silverio

(57) ABSTRACT

An image is divided into one or more (e.g., foreground) regions of interest with transition regions defined between each region of interest and the relatively least-important (e.g., background) region. Each region is encoded using a single selected quantization level, where quantizer values can differ between different regions. In general, in order to optimize video quality while still meeting target bit allocations, the quantizer assigned to a region of interest is preferably lower than the quantizer assigned to the corresponding transition region, which is itself preferably lower than the quantizer assigned to the background region. The present invention can be implemented iteratively to adjust the quantizer values as needed to meet the frame's specified bit target. The present invention can also be implemented using a non-iterative scheme that can be more easily implemented in real time. The present invention enables a video compression algorithm to meet a frame-level bit target, while ensuring spatial and temporal smoothness in frame quality, thus resulting in improved visual perception during playback.

20 Claims, 1 Drawing Sheet

INTRA-FRAME QUANTIZER SELECTION FOR VIDEO COMPRESSION

CROSS-REFERENCE TO RELATED APPLICATIONS

This application claims the benefit of the filing date of U.S. provisional application No. 60/100,939, filed on Sep. 18, 1998.

BACKGROUND OF THE INVENTION

1. Field of the Invention

The present invention relates to image processing, and, in particular, to video compression.

2. Description of the Related Art

The goal of video compression processing is to encode image data to reduce the number of bits used to represent a sequence of video images while maintaining an acceptable level of quality in the decoded video sequence. This goal is particularly important in certain applications, such as videophone or video conferencing over POTS (plain old telephone service) or ISDN (integrated services digital network) lines, where the existence of limited transmission bandwidth requires careful control over the bit rate, that is, the number of bits used to encode each image in the video sequence. Furthermore, in order to satisfy the transmission and other processing requirements of a video conferencing system, it is often desirable to have a relatively steady flow of bits in the encoded video bitstream.

Achieving a relatively uniform bit rate can be very difficult, especially for video compression algorithms that encode different images within a video sequence using different compression techniques. Depending on the video compression algorithm, images may be designated as the following different types of frames for compression processing:

An intra (I) frame which is encoded using only intra-frame compression techniques, A predicted (P) frame which is encoded using inter-frame compression techniques based on a previous I or P frame, and which can itself be used as a reference frame to encode one or more other frames, A bi-directional (B) frame which is encoded using bi-directional inter-frame compression techniques based on a previous I or P frame and a subsequent I or P frame, and which cannot be used to encode another frame, and A PB frame which corresponds to two images—a P frame and a B frame in between the P frame and the previous I/P frame—that are encoded as a single frame (as in the H.263 video compression algorithm).

Depending on the actual image data to be encoded, these different types of frames typically require different number of bits to encode. For example, I frames typically require the greatest numbers of bits, while B frames typically require the least number of bits.

In a typical transform-based video compression algorithm, a block-based transform, such as a discrete cosine transform (DCT), is applied to blocks of image data corresponding either to pixel values or pixel differences generated, for example, based on a motion-compensated inter-frame differencing scheme. The resulting transform coefficients for each block are then quantized for subsequent encoding (e.g., run-length encoding followed by variable-length encoding). The degree to which the transform coefficients are quantized directly affects both the number of bits used to represent the image data and the quality of the resulting decoded image. This degree of quantization is also referred to as the quantization level, which is often represented by a specified quantizer value that is used to quantize the transform coefficients. In general, higher quantization levels imply fewer bits and lower quality. As such, the quantizer is often used as the primary variable for controlling the tradeoff between bit rate and image quality.

Visual quality of video depends not only on global measures (like pixel signal to noise ratio (PSNR)), but also on how the error is distributed in space and time. Thus, it is important to maintain smoothness of the quantizer (which is closely related to the local distortion) across the picture. In fact, in many scenes, the ideal quantizer selection is a uniform value across the scene. However, such a scheme will not support the moving of bits to a region of interest from less-important regions, and furthermore, will provide very little control over the bits used to encode the picture. Thus, it cannot be used in constant (or near-constant) bit-rate applications (like videophone and video-conferencing over POTS or ISDN).

The other possibility is to vary the quantizer from macroblock-to-macroblock within the constraints of the coding standard being used (for example, in H.263, the quantizer level can change by a value of at most 2 in either direction). Examples of such schemes are given in the H.263+TMN8 (Test Model Near-Term 8) and TMN9 documents (see, e.g., ITU—Telecommunications Standardization Sector, "Video Codec Test Model, Near-Term, Version 9 (TMN9)", Document Q15-C-15, December 1997). In these schemes, while the frame-level bit target can be accurately met, there are many, possibly large quantizer changes, both spatially and temporally, which show up annoyingly in the moving video as undesirable artifacts.

SUMMARY OF THE INVENTION

As described in the previous section, some video compression algorithms, such as H.263, allow the quantizers to vary from macroblock to macroblock within a frame, although such algorithms often limit the magnitude of change in quantization level between horizontally adjacent macroblocks (e.g., a maximum change of +/−2 levels). In an application with limited bandwidth, this ability to vary the quantization level within a frame enables the video compression processing to judiciously allocate the available number of bits for encoding different regions of a frame differently, for example, allocating more bits (i.e., lower quantization level) to specific regions of interest (ROI). For example, in the classic videophone or video conferencing paradigm in which the foreground consists of a talking head centered on a relatively constant background, it may be advantageous to assign lower quantization levels to the foreground ROI than to the less important background in order to satisfy the bit rate requirements while optimizing video quality.

The present invention is directed to a scheme for selecting quantizers for use in encoding frames having one or more regions of interest. According to one embodiment, the present invention is a method for processing image data, comprising the steps of: (a) identifying one or more sets of image data corresponding to a region of interest in an image; (b) identifying one or more sets of image data corresponding to a transition region in the image located between the region of interest and a least-important region in the image; (c) selecting a first quantization level for each set of image data in the region of interest; (d) selecting a second quantization level for each set of image data in the transition region; (e)

selecting a third quantization level for each set of image data in the least-important region; and (f) encoding the image based on the selected first, second, and third quantization levels.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
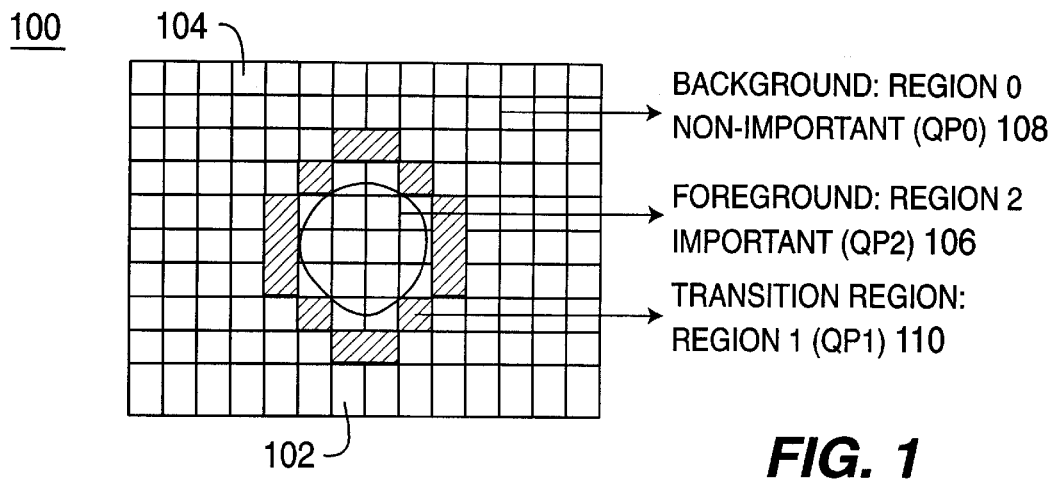
FIG. 1 shows a example of a typical image that can be encoded using the present invention.

FIG. 1 shows a example of a typical image 100 that can be encoded using the present invention. The image in FIG. 1 consists of the head and shoulders of a person 102 positioned in front of background imagery 104, where the image data corresponding to the head of person 102 varies more in time (i.e., from frame to frame) than the background imagery. Such a scene is typical of videophone and video-conferencing applications. In general, during playback, the person in the foreground is of greater importance to the viewer of image 100 than the background imagery. According to the present invention, when bit rate is limited, image 100 is encoded such that, during playback, the video quality of the more-important foreground imagery is greater than the video quality of the less important background imagery. This variation in playback video quality within an image is achieved by allowing the quantizers used during the video compression processing to encode the macroblocks of image 100 to vary within the image. According to the present invention, the selection of quantizers follows a particular scheme, described as follows.

As shown in FIG. 1, image 100 is divided into three different regions: a foreground region 106 (also referred to as a region of interest (ROI)) consisting of those macroblocks corresponding to the head of person 102, a background region 108 (also referred to as the least-important region) consisting of macroblocks corresponding to background imagery 104 (including the shoulders of person 102), and a transition region 110 consisting of macroblocks located between the foreground region and the background region. According to the present invention, all of the macroblocks corresponding to the foreground region 106 are encoded using the same quantizer QP2, all of the macroblocks corresponding to the background region 108 are encoded using the same quantizer QP0, and all of the macroblocks corresponding to the transition region 110 are encoded using the same quantizer QP1, where, typically, QP0>=QP1>=QP2.

Figure 2:
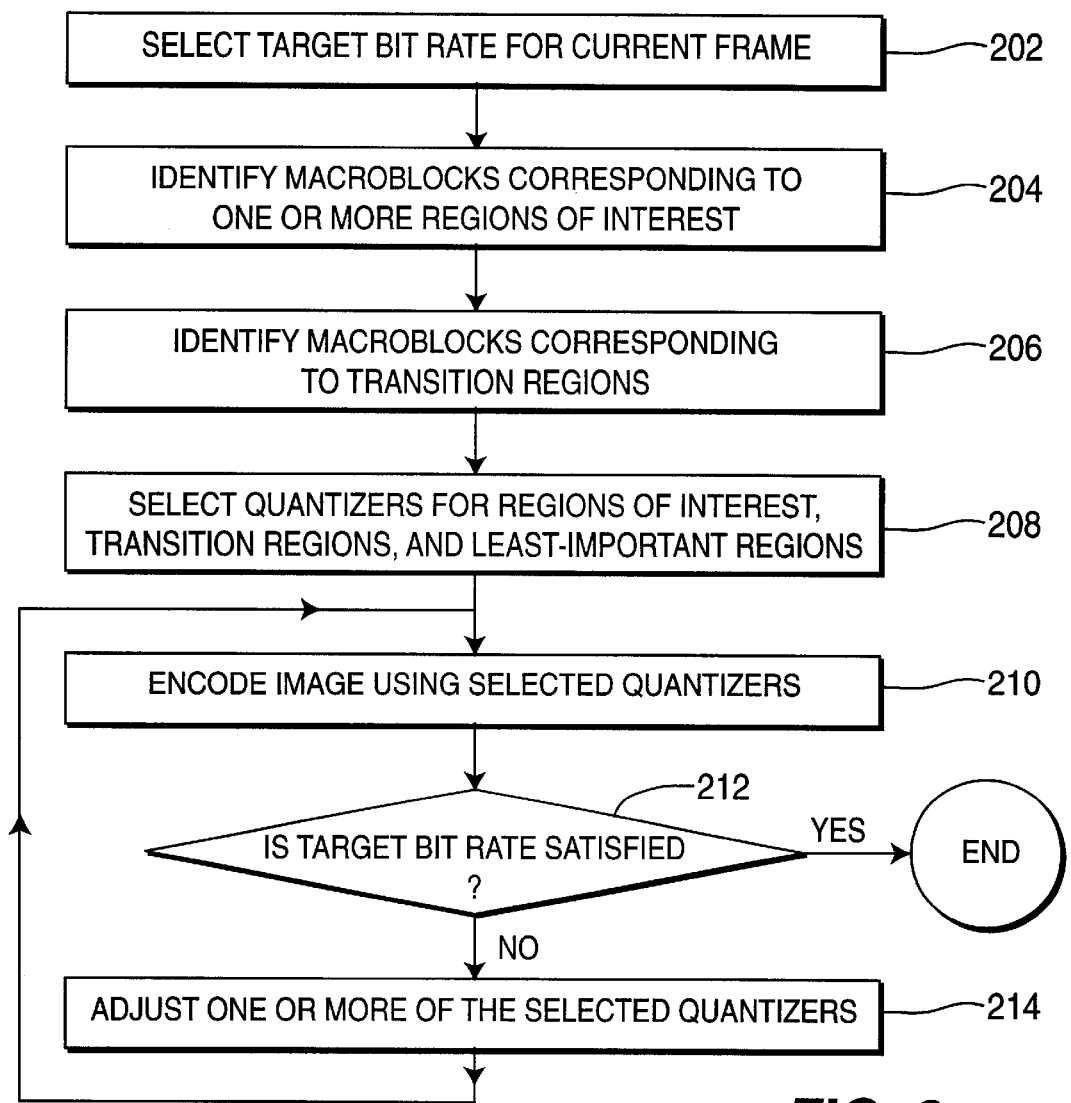
FIG. 2 shows a flow diagram of the image processing implemented according to one embodiment of the present invention for an image, such as the image of FIG. 1.

FIG. 2 shows a flow diagram of the image processing implemented according to one embodiment of the present invention for an image, such as image 100 of FIG. 1. The present invention is typically implemented by a video processor that performs various conventional image processing routines, such as motion estimation, motion-compensated inter-frame differencing, transform application, quantization, run-length encoding, and variable-length encoding, as part of its overall video compression algorithm. Not all of this processing is shown in FIG. 2, which begins with the selection of a bit target for the present image (i.e., a desired number of bits to be used to encode the present image) based on a suitable bit rate scheme (step 202).

After selecting a bit target, the image is analyzed in step 204 to identify those macroblocks corresponding to one or more regions of interest (e.g., foreground region 106 corresponding to the head of person 102 in image 100 of FIG. 1). The analysis of step 204 is referred to as segmentation analysis, which, for purposes of the present invention, can be implemented using any suitable scheme, including automatic schemes or interactive schemes in which the regions of interest are explicitly identified by the user (e.g., a participant in a video-conference located either at the encoder or the decoder).

After identifying the regions of interest, the macroblocks corresponding to one or more transition regions are then identified (step 206). In one embodiment, a macroblock is defined as being part of a transition region if it borders on at least one side a macroblock that is part of a region of interest identified in step 204. The rest of the macroblocks in the image are identified as being part of the least-important background region.

In the example of image 100 in FIG. 1, there is only one region of interest 106, one corresponding transition region 110, and one background region 108. Note that a transition region need not necessarily be defined by a single contiguous set of macroblocks. The same is true for the background region. Depending on the particular image and the particular application, an image may have two or more different regions of interest and two or more different corresponding transitions regions.

After identifying the macroblocks corresponding to the different regions, an initial quantization level is selected for each region (step 208). According to the present invention, the macroblocks of each region are encoded using a single uniform quantization level, where the quantization level may be different for the different regions. In general, when there are two or more different regions of interest and/or two or more different transition regions, the quantization level differs between different regions of interest and/or between different transition regions, as long as the quantization level is constant within each particular region. For example, a first region of interest may be more important than a second region of interest. In that case, it might be desirable to assign a lower quantizer to the first region of interest than to the second region of interest. In any case, each region of interest will still have a corresponding transition region that is encoded using its own, possibly different quantizer.

In one implementation, the initial quantization levels are selected based on information related to the previously encoded image in the video sequence. This initial selection of quantizers may be based on the previous frame's actual quantizer assignments and bit expenditure, as well as on comparison of the current bit target and the current motion-compensated distortion with those of the previous frame. For example, if the previous frame's bit expenditure was higher than the previous bit target or if the current bit target is lower than the previous bit target or if the current distortion is higher than the previous distortion, then the previous quantizer assignments may need to be increased for the initial selection for the current frame.

In order to avoid abrupt variations in quality between regions it is desirable that the quantizer used to encode a transition region be fairly close to the quantizers used to encode both the corresponding foreground region of interest and the least-important background region. In some video compression algorithms, such as those conforming to the H.263 framework, the difference between horizontally adjacent quantizers is already constrained (e.g., never more than 2). Also, it is preferable that the quantizers actually increase from foreground to transition and from transition to background, so that the quality in the regions of interest can be optimized compared to the quality in the other regions. Note that transition regions frequently contain occlusions and artifacts surrounding the region of interest (like a talking head, for example) and using a lower quantizer here (as compared to the rest of the least-important region) can be expected to improve the overall visual quality of the video/image.

After selecting initial quantization levels for the various regions, the image is encoded using those quantizers (step 210). The number of bits used to encode the image is then compared with the bit target (step 212). If the number of bits used is sufficiently close to the bit target (e.g., within a specified tolerance), then processing is terminated. Otherwise, if the number of bits used is either too much smaller or too much greater than the bit target, then one or more of the quantizers are appropriately adjusted (step 214) and processing returns to step 210 to re-encode the image using the adjusted quantizers. Steps 210–214 are repeated iteratively until the bit target is sufficiently satisfied.

If the number of bits used is too small relative to the bit target, then the quantization level selected for the region of interest (QP2 in FIG. 1) is preferably first decreased. Depending on the existing differences between the quantizers for the different regions and the constraints applied by the overall video compression algorithm related to the magnitude of quantization-level changes between horizontally adjacent macroblocks, it may also be necessary to decrease the quantizer assigned to the transition region (QP1), which may in turn make it necessary to decrease the quantizer assigned to the background region (QP0). For example, assume that initially QP2=10, QP1=12, and QP0=13, and that the maximum allowable quantizer change is 2. Assume further that the number of bits used to encode the image based on these quantizers is too low. In order to optimize video quality for the assigned bit target, it is desirable to decrease QP2 to 9. This change results in the need to decrease QP1 to 11 to avoid violating the maximum allowable horizontal quantizer change between macroblocks of 2. In this situation, QP0 will not have to be changed. However, if the number of bits is still too low, all three quantizers will have to be decremented on the next iteration.

Similarly, if the number of bits is too large relative to the bit target, then the quantization level selected for the background region (QP0) is preferably first increased. Here, too, depending on the situation, this increase in QP0 may result in the need to increase the quantizer assigned to the transition region (QP1), which may in turn make it necessary to increase the quantizer assigned to the foreground region of interest (QP2).

In general, when too few bits are used, it is desirable to add bits first to the foreground region of interest, and, when too many bits are used, it is desirable to remove bits first from the background least-important region. In low activity scenes, the quantizer selection algorithm of the present invention may be unable to match sufficiently the frame's bit target. In many cases, especially in low-activity situations, the frame rate may not be very significant. As such, variations can be allowed in the frame-level bit expenditure, and/or conformance to channel requirements can be achieved by varying the instantaneous frame rate.

The present invention has been described in the context of a multi-pass encoding strategy that assigns different quantizer step sizes to different regions of an image while meeting a frame-level bit target and ensuring spatial and temporal smoothness in frame quality. This results in improved visual quality. However, because the scheme is computationally intensive, it may not be able to be used in real-time applications.

The invention can also be implemented as a real-time "pseudo-multi-pass" scheme based on modeling the rate-distortion curves at different quantization parameters. According to this scheme, the number of bits required to encode a macroblock is modeled according to the following equation:

$$R\_q = (X\_q * S\char`\^(1+Q/Q\_d))/Q$$

where:

$R\_q$ is the number of bits required to code a macroblock using quantization parameter Q;

$X\_q$ is the model constant at Q;

S is the distortion of the macroblock; and $Q\_d$ is the model coefficient in exponent of S.

The big skip between an I frame and the following P frame is used to initialize the model. A P frame is used in this interval (but not coded) to calculate initial model parameters by encoding all macroblocks at all possible values of Q. This model is constantly updated as the sequence is coded. As such, the model adapts very well to scene content.

When encoding of a frame is begun, the frame level rate control provides a frame-level bit target. Based on the above rate-distortion model, the quantization parameters are selected for the different regions. The important region is given a quantizer of QP−2, the transition region is given QP, and the background is given a quantizer of (QP+2). This ensures near-transmittability of the quantization parameters (DQUANTs). The value of QP that comes closest to the frame-level bit target is chosen.

The present invention provides the twin advantages of frame-level rate control and the ability to adapt the quantizer to reflect the importance of the region, while maintaining spatial and temporal smoothness of the quantizer. As such, the present invention enables a video compression algorithm to meet a frame-level bit target, while ensuring spatial and temporal smoothness in frame quality, thus resulting in improved visual perception during playback.

Although the invention has been described in the context of the talking head paradigm of videophone and video-conferencing applications, the invention is also applicable for different kinds of schemes, preferably where the different regions are fairly contiguous.

Similarly, although the present invention has been described in the context of embodiments in which quantization level corresponds to a specified quantizer parameter that is used to quantize each transform coefficient, the present invention can also be implement in alternative embodiments, such as those in which quantization level corresponds to a quantization table in which each transform coefficient in a block of coefficients is assigned its own, possibly different quantizer value.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing digital image data of an already digitized image in accordance with a compression algorithm that imposes a maximum difference between quantization levels for consecutive macroblocks in the digitized image, comprising the steps of:
   (a) identifying one or more macroblocks corresponding to a region of interest in the digitized image;
   (b) identifying one or more macroblocks corresponding to a transition region in the digitized image located between the region of interest and a least-important region in the digitized image;
   (c) selecting a first quantization level for each macroblock in the region of interest;
   (d) selecting a second quantization level for each macroblock in the transition region, wherein the second quantization level is greater than the first quantization level;
   (e) selecting a third quantization level for each macroblock in the least-important region, wherein:
      the third quantization level is greater than the second quantization level; and
      the difference between the third and first quantization levels is up to twice as large as the maximum difference imposed by the compression algorithm; and
   (f) encoding the digitized image based on the selected first, second, and third quantization levels in accordance with the compression algorithm.

2. The invention of claim 1, further comprising the steps of:
   (g) comparing the number of bits used to encode the image in step (f) to a bit target for the image;
   (h) adjusting one or more of the first, second, and third quantization levels in accordance with the comparison of step (g); and
   (i) re-encoding the image based on the adjusted quantization levels.

3. The invention of claim 2, wherein steps (g)–(i) are repeated until the number of bits used to encode the image is sufficiently close to the bit target.

4. The invention of claim 2, wherein:
   if the number of bits in step (g) is sufficiently low, then step (h) comprises the step of decreasing the first quantization level and, if appropriate, decreasing the second quantization level, and then, if appropriate, decreasing the third quantization level; and
   if the number of bits in step (g) is sufficiently high, then step (h) comprises the step of increasing the third quantization level and, if appropriate, increasing the second quantization level, and then, if appropriate, increasing the first quantization level.

5. The invention of claim 1, wherein the image has two or more regions of interest and each region of interest is assigned its own quantization level, which may differ between regions of interest.

6. The invention of claim 1, wherein the region of interest corresponds to a talking head and the least-important region corresponds to a relatively stationary background.

7. The invention of claim 1, wherein at least one of the first, second, and third quantization levels is selected based on modeling of rate-distortion curves at different quantization levels.

8. The invention of claim 7, wherein a number of bits used to encode a macroblock is modeled as follows:

$$R\_q=(X\_q*S\string^(1+Q/Q\_d))/Q$$

where:
   $R\_q$ is a number of bits used to code a macroblock using quantization parameter Q;
   $X\_q$ is a model constant at Q;
   S is a distortion of the macroblock; and
   $Q\_d$ is a model coefficient in exponent of S.

9. The invention of claim 8, wherein the model is initialized between an I frame and the following P frame by encoding each macroblock of an intervening frame using two or more quantization levels.

10. The invention of claim 8, wherein the model is updated as the image data are coded.

11. A computer-readable medium having stored thereon a plurality of instructions, the plurality of instructions including instructions which, when executed by a processor, cause the processor to implement a method for processing digital image data of an already digitized image in accordance with a compression algorithm that imposes a maximum difference between quantization levels for consecutive macroblocks in the digitized image, the method comprising the steps of:
   (a) identifying one or more macroblocks corresponding to a region of interest in the digitized image;
   (b) identifying one or more macroblocks corresponding to a transition region in the digitized image located between the region of interest and a least-important region in the digitized image;
   (c) selecting a first quantization level for each macroblock in the region of interest;
   (d) selecting a second quantization level for each macroblock in the transition region, wherein the second quantization level is greater than the first quantization level;
   (e) selecting a third quantization level for each macroblock in the least-important region, wherein:
      the third quantization level is greater than the second quantization level; and
      the difference between the third and first quantization levels is up to twice as large as the maximum difference imposed by the compression algorithm; and
   (f) encoding the digitized image based on the selected first, second, and third quantization levels in accordance with the compression algorithm.

12. The invention of claim 11, further comprising the steps of:
   (g) comparing the number of bits used to encode the image in step (f) to a bit target for the image;

(h) adjusting one or more of the first, second, and third quantization levels in accordance with the comparison of step (g); and (i) re-encoding the image based on the adjusted quantization levels.

13. The invention of claim 12, wherein steps (g)–(i) are repeated until the number of bits used to encode the image is sufficiently close to the bit target.

14. The invention of claim 12, wherein:

if the number of bits in step (g) is sufficiently low, then step (h) comprises the step of decreasing the first quantization level and, if appropriate, decreasing the second quantization level, and then, if appropriate, decreasing the third quantization level; and if the number of bits in step (g) is sufficiently high, then step (h) comprises the step of increasing the third quantization level and, if appropriate, increasing the second quantization level, and then, if appropriate, increasing the first quantization level.

15. The invention of claim 11, wherein the image has two or more regions of interest and each region interest is assigned its own quantization level, which may differ between regions of interest.

16. The invention of claim 11, wherein the region of interest corresponds to a talking head and the least-important region corresponds to a relatively stationary background.

17. The invention of claim 11, wherein at least one of the first, second, and third quantization levels is selected based on modeling of rate-distortion curves at different quantization levels.

18. The invention of claim 17, wherein a number of bits used to encode a macroblock is modeled as follows:

$$R\_q = (X\_q * S^{(1+Q/Q\_d)})/Q$$

where:

$R\_q$ is a number of bits used to code a macroblock using quantization parameter Q;

$X\_q$ is a model constant at Q;

S is a distortion of the macroblock; and $Q\_d$ is a model coefficient in exponent of S.

19. The invention of claim 18, wherein the model is initialized between an I frame and the following P frame by encoding each macroblock of an intervening frame using two or more quantization levels.

20. The invention of claim 18, wherein the model is updated as the image data are coded.

* * * * *